United States Patent [19]
Kawai

[11] Patent Number: 5,646,739
[45] Date of Patent: Jul. 8, 1997

[54] PRINT DEVICE HAVING A RECORDING MATRIX SWITCHING DEVICE

[75] Inventor: Sunao Kawai, Nagoya, Japan

[73] Assignee: Brother Kogyo Kabushiki Kaisha, Nagoya, Japan

[21] Appl. No.: 392,113

[22] Filed: Feb. 22, 1995

[30] Foreign Application Priority Data

Mar. 2, 1994 [JP] Japan ................... 6-032124

[51] Int. Cl.$^6$ .................. H04N 1/04; H04N 1/40
[52] U.S. Cl. .......... 358/296; 358/298; 358/457; 358/488
[58] Field of Search .................. 358/296, 298, 358/448, 449, 457, 465, 466, 488, 498; 399/181, 388, 389, 393

[56] References Cited

U.S. PATENT DOCUMENTS

| | | | |
|---|---|---|---|
| 4,933,720 | 6/1990 | Takano et al. | 355/209 |
| 5,228,118 | 7/1993 | Sasaki | 395/112 |
| 5,313,257 | 5/1994 | Kashima et al. | 355/309 |
| 5,508,810 | 4/1996 | Sato | 358/296 |

*Primary Examiner*—Eric Frahm
*Attorney, Agent, or Firm*—Oliff & Berridge

[57] ABSTRACT

In a print device using a systematic dither method, a sheet direction is identified by a sheet printing direction identifying unit. If the direction is identified as a lateral direction, threshold values of a recording matrix are rotated by 90 degrees by a threshold value altering unit. A binary image is reproduced from halftone image data on the basis of the recording matrix by the systematic dither method.

19 Claims, 12 Drawing Sheets

Fig. 7B

| STEP S1 | IS THE SHEET IN THE LATERAL DIRECTION? |
|---------|----------------------------------------|
| STEP S2 | ROTATE THE MATRIX BY 90 DEGREES |
| STEP S3 | CONVERT THE IMAGE TO BINARY DATA |
| STEP S4 | PRINT BINARY DATA |

Fig.8 A

| 1 | 2 | 3 |
|---|---|---|
| 4 | 5 | 6 |
| 7 | 8 | 9 |

Fig.8 B

| 3 | 6 | 9 |
|---|---|---|
| 2 | 5 | 8 |
| 1 | 4 | 7 |

|  |  |  |
|---|---|---|
| 0.7 | 0.4 | 0.9 |
| 0.2 | 0.1 | 0.5 |
| 0.6 | 0.3 | 0.8 |

PRINT DEVICE HAVING A RECORDING MATRIX SWITCHING DEVICE

BACKGROUND OF THE INVENTION

1. Field of the Invention

This invention relates to a print device using a half-tone image reproduction method in which output dots are suitably arranged in a recording matrix to digitize a half-tone or gray-scale image for reproduction.

2. Description of the Related Art

In a conventional print device which is not capable of representing a half-tone image on a picture-element basis, the half-tone image data is converted to binary data for reproduction with a systematic dither method, and then printed.

The systematic dither method is defined as follows. A recording matrix comprising a plurality of device picture elements (pixels) is assumed. The output level of the half-tone image data for a portion (image pixel) of an original image which is to be reproduced is compared with the varying threshold level set for each device pixel in the corresponding portion of the recording matrix. If the output level exceeds the threshold level of a device pixel of the recording matrix, a black dot (output dot) is displayed at that device pixel. This method provides high-speed conversion of half-tone image data to binary image data in a simple control system, so that it has been widely used for many print devices.

Further, for the systematic dither method, a dot-concentration type has been frequently used in which a point on the recording matrix is set as a center point and threshold values of the recording matrix, which are set for every picture element, are set at smaller values for picture elements which are nearer to the center point of the recording matrix, so that the output dots are concentrically arranged around the center point. However, if the dot concentration points as described above are merely arranged in the vertical or horizontal directions, a reproduced image will have a striped pattern artifact imposed on it, because human eyes are sensitive to longitudinal or lateral arrangements. In order to avoid this problem, the threshold levels of the recording matrix are frequently set so that the dot concentration points are arranged in a slanting direction relative to the axes of the sheet on which the image will be formed, so that the arrangement of the dot concentration points becomes inconspicuous to human eyes, since human eyes are relatively insensitive to arrangements in the slant direction.

Further, in a print device in which the threshold values of the recording matrix are freely set to any value, a tiling processing has been frequently used. In this tiling process, the threshold values are set so that the output dots form a figure pattern. A reproduced image is filled with the figure pattern using a function of the systematic dither method.

However, in the conventional print device as described above, the setting of the threshold values is conducted in a fixed printing direction of the device at all times. Thus, when an image is printed on a sheet of paper which is longitudinally arranged (portrait), as shown in FIGS. 11A and 11B, the image on the longitudinal sheet differs from the same image when it is printed on a sheet of paper which is laterally arranged (landscape), as shown in FIGS. 11C and 11D.

FIGS. 1A–1C show half-tone image data and the corresponding cell patterns. FIG. 1A represents a half-tone image 200 which is input as print data, FIG. 1B represents a brick type cell pattern 201 which is formed on the basis of a recording matrix, and FIG. 1C represents an oblique-line type cell pattern 202.

FIGS. 11A–11D show print results using the cell patterns shown in FIGS. 1B and 1C when the printing direction is varied. FIGS. 11A and 11B represent print results which are obtained by using the cell patterns 201 and 202, respectively, to print a triangular portion of the half-tone image 200 on a sheet which is placed in the longitudinal direction (hereinafter referred to as the "longitudinal arrangement" or the "portrait arrangement"). FIGS. 11C and 11D represent print results, which are obtained by using the cell patterns 201 and 202, respectively, to print the triangular portion on a sheet which is placed in the lateral direction (hereinafter referred to as the "lateral arrangement" or the "landscape arrangement"). As apparent from comparison among FIGS. 11A–11D, the cell pattern differs by 90° with respect to the direction of the figure of the input print data between the longitudinal and lateral arrangements.

SUMMARY OF THE INVENTION

This invention thus provides a print device in which the same output image results for the same print data irrespective of the sheet arrangement direction.

In order to attain this and other objects, the print device according to this invention uses a half-tone image reproduction method in which the output dots are suitably arranged within a prescribed recording matrix and the image data of a half-tone or gray-scale image is converted to binary data for reproduction, and includes identifying means for identifying a sheet printing direction, and threshold value altering means for altering the threshold values of the set recording matrix based on the identified sheet direction output by the identifying means.

It should be appreciated that this method and device for altering the threshold values of the recording matrix is not limited to use with half-tone or gray-scale images or only with printers which are not capable of printing half-tone or gray-scale images.

Rather, the method and device of this invention can be used with any printer that uses a recording matrix to print the image data, independently of the type of the image data to be printed or the type of recording matrix used. Thus, for any printer that uses a recording matrix, by using the method and/or device of this invention, the output image generated by the printer has the same appearance independently of the sheet direction, without regard to the type of recording matrix implemented by the printer or the type of the image data received by the printer.

In addition, if more than one recording matrix is implemented in the printer, the CPU 603 determines the type of the image data stored in the image buffer 611. Then, the CPU 603 selects the most appropriate one of the implemented recording matrices to be used by the development program area 604 of the ROM 600 to convert the image data in the image buffer 611 into print data to be stored in the print buffer 612. Thus, if the image data is, for example, text, the recording matrix for converting text to binary data is selected, while, if the recording matrix is, for example, line art, the recording matrix for converting line art to binary data is selected.

The threshold values may be set for each picture element of the recording matrix. The threshold value altering means may rearrange the set threshold values so that the threshold values are interchanged between columns and lines.

In the print device of this invention thus constructed, the sheet printing direction is identified by the identifying means, and the threshold values of the recording matrix are altered by the threshold value altering means based on the identified sheet direction. The threshold value altering means may rearrange the threshold values so that the threshold values are interchanged between lines and columns if the threshold values are set for every picture element of the recording matrix.

BRIEF DESCRIPTION OF THE DRAWINGS

The preferred embodiments of this invention will be described in detail, with reference to the following figures, wherein:

FIGS. 7A and 7B are a flowchart for an altering operation for a threshold value of a recording matrix;

FIGS. 8A and 8B show variations of the recording matrix in accordance with a sheet printing direction;

DETAILED DESCRIPTION OF THE PREFERRED EMBODIMENT

A print device of the preferred embodiment cannot represent half-tone values on a picture-element basis. Thus, it performs a print operation by converting the half-tone image data to binary values with a half-tone screening of the systematic dither method.

Figure 1A:
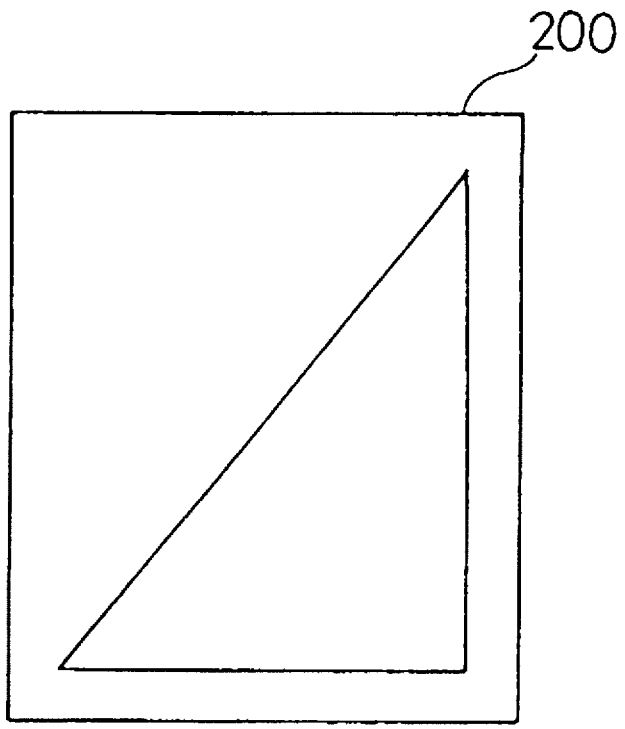
FIG. 1A is schematic view showing a half-tone image.
Figure 1B:
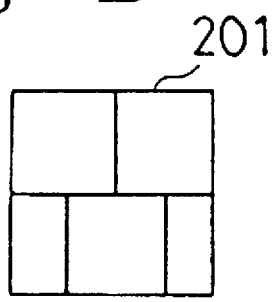
FIGS. 1B and 1C are schematic views showing cell patterns.
Figure 1C:
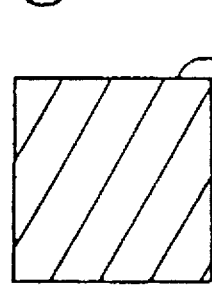
Figure 2:
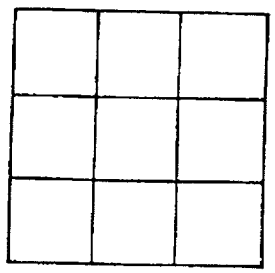
FIGS. 2A–2J are diagrams showing binary cell densities using a dither method for different half-tone values.
Figure 2:
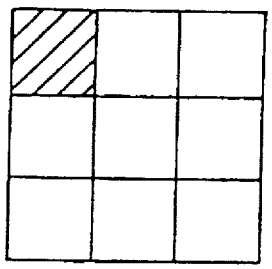
Figure 2:
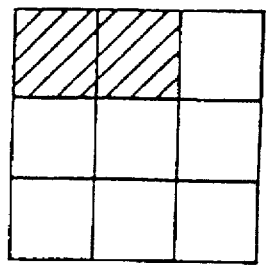
Figure 2:
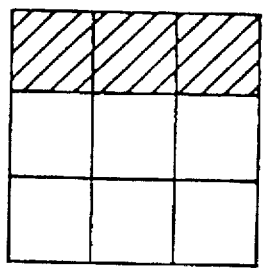
Figure 2:
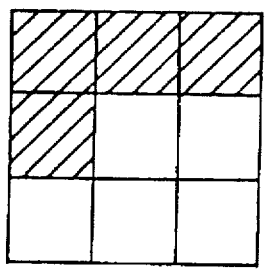
Figure 2:
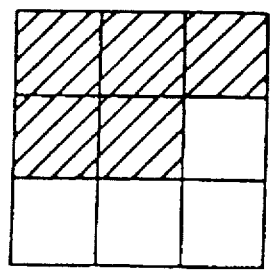
Figure 2:
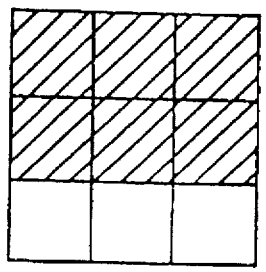
Figure 2:
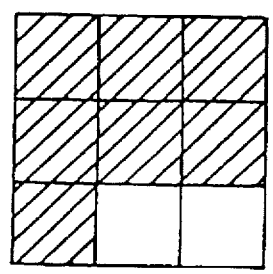
Figure 2:
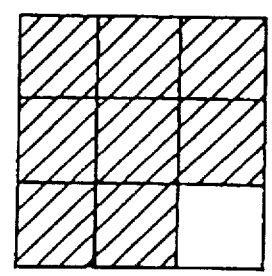
Figure 2:
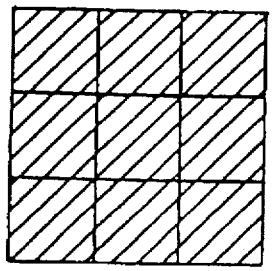

The half-tone screening has been widely used as a method of representing a gradation in a digital printer which has only binary outputs. In this method, a plurality of device pixels, each corresponding to the minimum unit printable by the printer (the device pixel), are bundled into a half-tone cell or image pixel. The half-tone gradation is represented on a half-tone cell basis, so that a half-tone gradation printing operation can be performed. For example, during a process of successively filling a black point into each 3×3 half-tone cell, ten patterns as shown in FIGS. 2A–2J are formed. Now, when a print operation is performed, the nine-device-pixel half-tone cell can represent ten levels of the black density (10-level gradation), which corresponds to a pattern having no black device pixels (FIG. 2A) to a pattern having nine black device pixels (FIG. 2J). Accordingly, a half-tone image having 10 gray levels can be printed even by a printer having only binary outputs. This is an effect of the halftone screening.

In the print device of this embodiment, the systematic dither method is used to control a print order of points within a half-tone cell in the halftone screening. In the systematic method, a matrix of threshold values, (hereinafter referred to as the "recording matrix") is assumed, each threshold value is allocated to one device pixel in each half-tone cell or image pixel. The threshold value of the recording matrix for each device pixel of the half-tone cell or image pixel is compared with the density level of the corresponding data of the original half-tone image to be reproduced. If the density level exceeds the threshold value for that device pixel, a black dot (output dot) is set to the corresponding device pixel. The density level is defined as a numerical value (from 0 to 1) representing the shade (depth) of a color. Accordingly, the density level corresponds to a value for representing a color on the assumption that the density of an intermediate color between no color (represented by "0") and the maximum density color (represented by "1"), linearly varies. For monochromatic image data, "0" and "1" represent white and black colors, respectively, and "0.5" represents a gray color equally between white and black.

Figure 3:
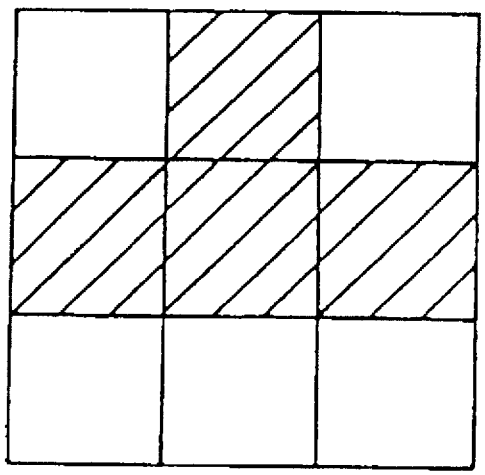
FIG. 3A shows a recording matrix.
FIG. 3B shows a picture element which is set to an output level of 0.5 according to the recording matrix shown in FIG. 3A.

When the threshold levels of the device pixels of the half-tone cell or image pixel are set as shown in FIG. 3A, and the output level of the corresponding portion of the original image is equal to 0.5, those device pixels which have threshold values smaller than 0.5 are set (blackened), thereby obtaining the half-tone cell or image pixel shown in FIG. 3B.

Figure 4:
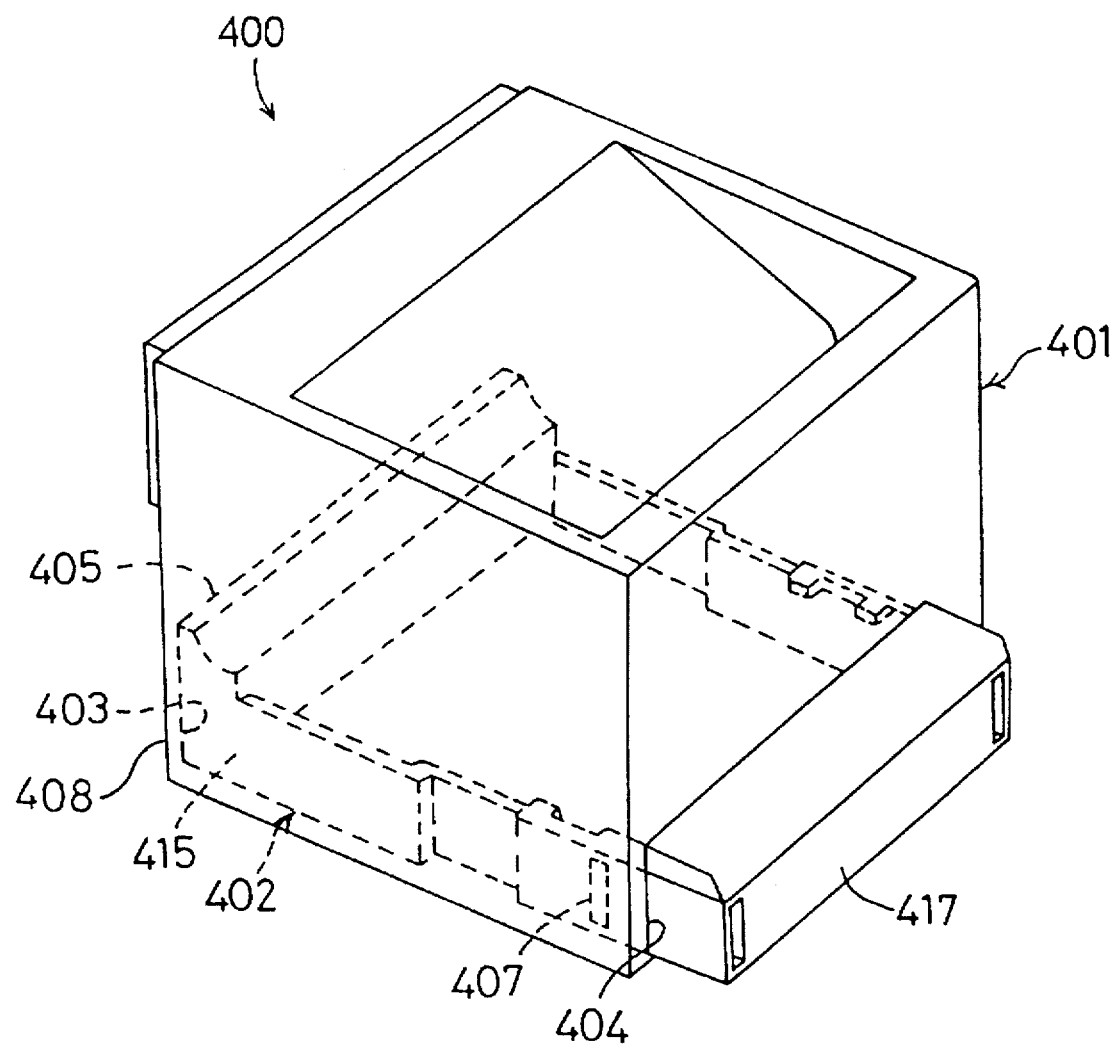
FIG. 4 shows a perspective view of a print device in which a paper cassette is mounted.
Figure 5:
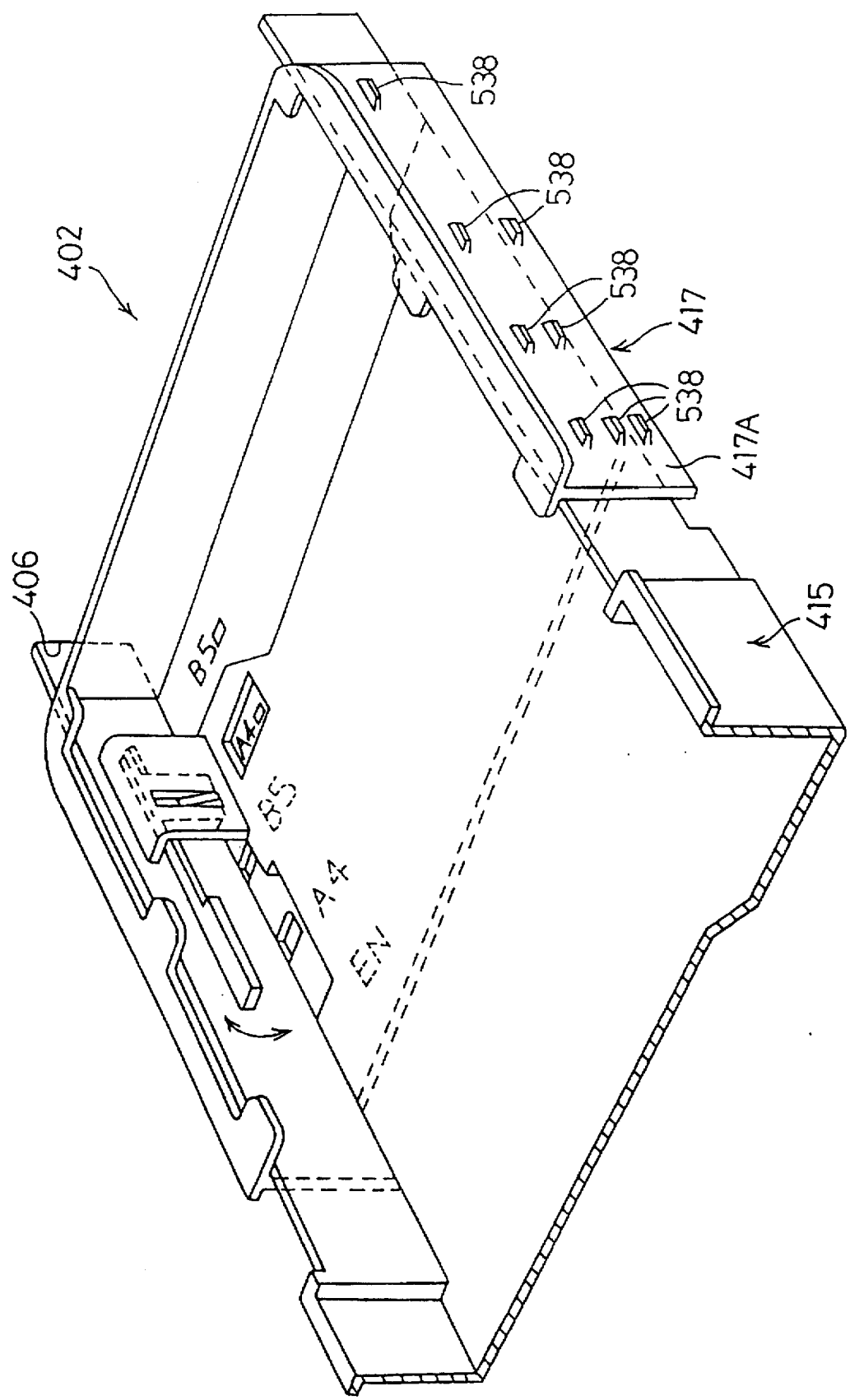
FIG. 5 shows a perspective view, partially cutaway, of an essential part of the paper cassette shown in FIG. 4.

As shown in FIGS. 4 and 5, a paper cassette 402, for storing a plurality of sheets of paper, is insertable into a body 401 of the print device 400, such as a laser printer. A lower portion of the body 401 is formed as a paper feed section 408. The paper feed section 408 of the body 401 has a front opening 403 allowing the paper cassette 402 to be inserted, and rear opening 404 for allowing a rear portion of the paper cassette 402 to project beyond the bounds of the body 401.

The paper cassette 402 is generally constructed of a main frame 415 and an auxiliary frame 417. The main frame 415 has a rectangular shape and is open on its upper side. The main frame 415 has a closed front end 405 and an open rear end 406. The auxiliary frame 417 is relatively movably mounted to the main frame 415, such that the auxiliary frame 417 can be adjusted in a longitudinal direction (front and rear direction) relative to the rear end 406 of the main frame 415, to match a paper size and a paper printing direction of the paper currently stored within the paper cassette 402.

A plurality of paper size detecting ribs 538 project outwardly from the outer side surface of a right side plate 417A of the auxiliary frame 417. Each one of the paper size detecting ribs 538 corresponds to a different one of the various paper sizes and paper printing directions usable with the printer 400. A sensor 407, such as a limit switch, is provided on a side surface of a rear portion of the paper feed section of the body 401. The limit switch 407 detects the paper size and the paper printing direction of the paper currently stored in the paper cassette 402. That is, when the paper cassette 402 storing the paper of a desired size and a desired printing direction is inserted into the paper feed section 408 of the body 401, a corresponding one of the paper size detecting ribs 538, which corresponds to the currently stored paper size, comes into contact with the sensor 407, thereby identifying the size of the paper stored in the paper cassette 402. Some of the paper size detecting ribs 538 correspond to sheets placed in the longitudinal arrangement and some of them correspond to sheets placed in the lateral arrangement, so that the sensor 407 can determine not only the paper size but also the paper printing direction.

The detailed constitution of a print device with a paper cassette like the above-described print device is shown in U.S. Pat. No. 5,313,257, the disclosure of which is incorporated herein by reference.

Figure 6:
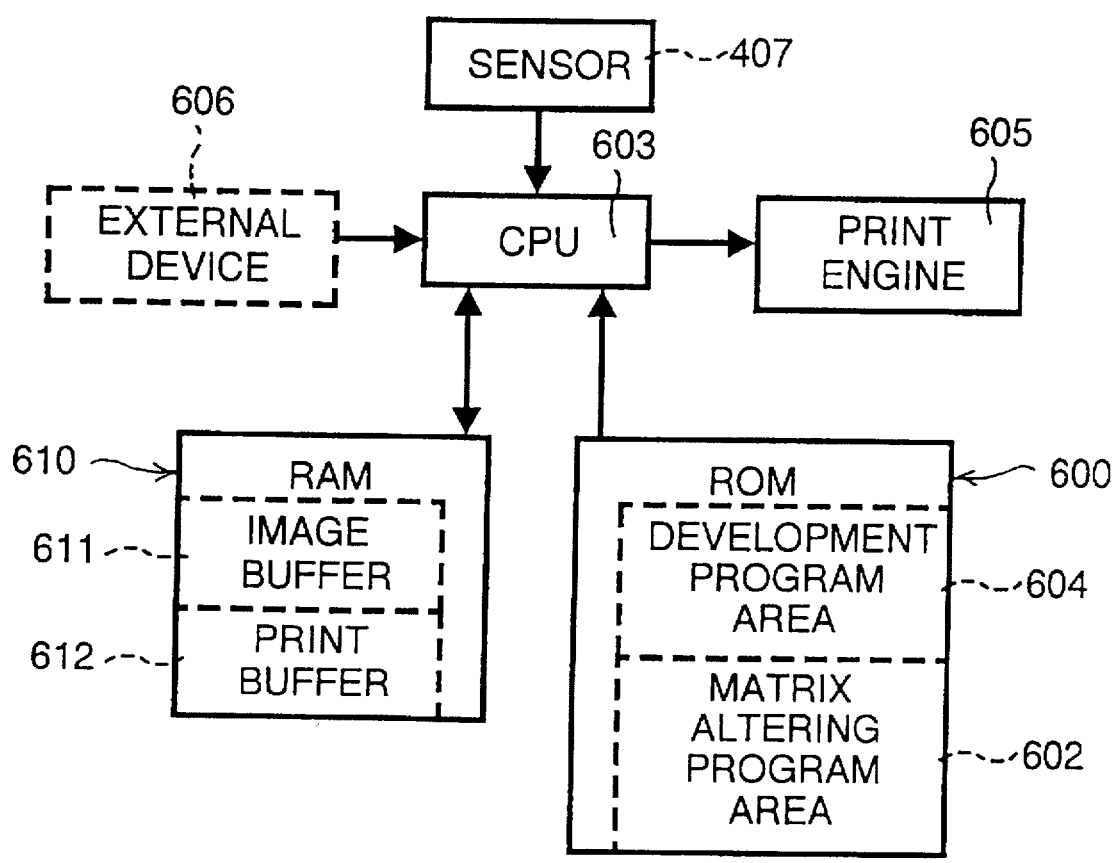
FIG. 6 is a block diagram showing a control system for the print device.

FIG. 6 is a block diagram showing the control system of the print device according to this embodiment. The print device of this embodiment includes a CPU 603 controlling the whole system of the device based on programs stored in a ROM 600. The CPU 603 uses a RAM 610 as a working area. The ROM 600 includes a matrix altering program area 602 and a development program area 604. The development program area 604 stores an image data development program for converting half-tone image data input from an external device 606, such as a host computer or the like, to printable binary image data through the halftone screening. The image data development program includes the recording matrix comprising the plurality of threshold values, and is referenced when the input half-tone image data is converted to the binary image data by the halftone screening. The matrix altering program area 602 stores a recording matrix altering program for altering the recording matrix used when the input half-tone image data is converted to the binary image data by the halftone screening. The RAM 610 includes an image buffer 611 for storing the half-tone image data input from the external device 606 and a print buffer 612 for storing the printable binary image data converted from the image data through the halftone screening.

The sensor 407 detects a size and a printing direction of the paper currently stored in the paper cassette 402 by coming into contact with the paper size detecting ribs 538. The CPU 603 identifies a printing direction of the sheets set in the paper cassette 402 based on a detection signal output from the sensor 407. The CPU 603 alters the recording matrix based on the identified printing direction (and possibly on the current state of the recording matrix used in the recording matrix altering program. That is, the CPU 603 optionally detects the current state of the recording matrix, and alter it only if it does not correspond to the identified printing direction). A print engine 605 is connected to the CPU 603 and is controlled by the CPU 605 to print the binary image data on the sheet.

Figure 7A:
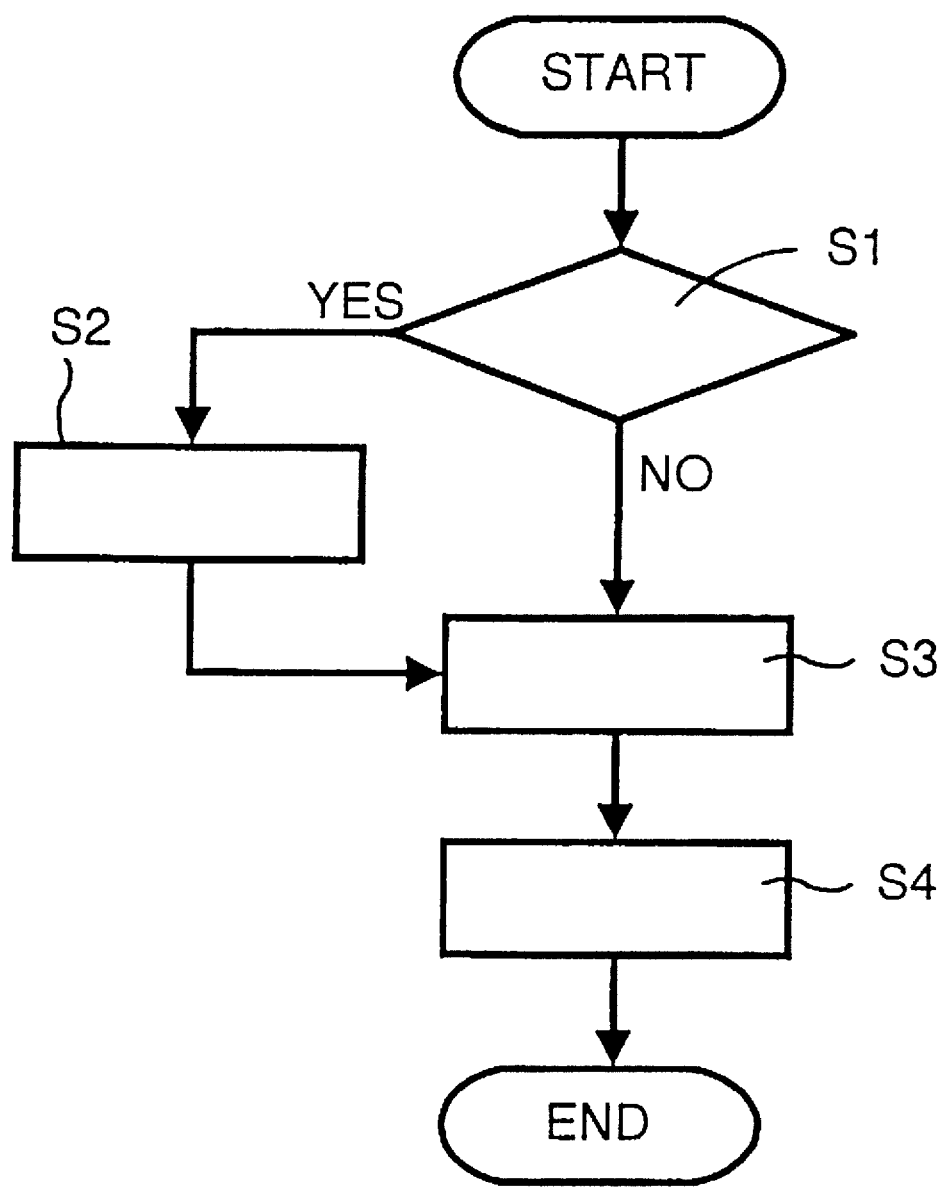
Figures 8A, 8B:
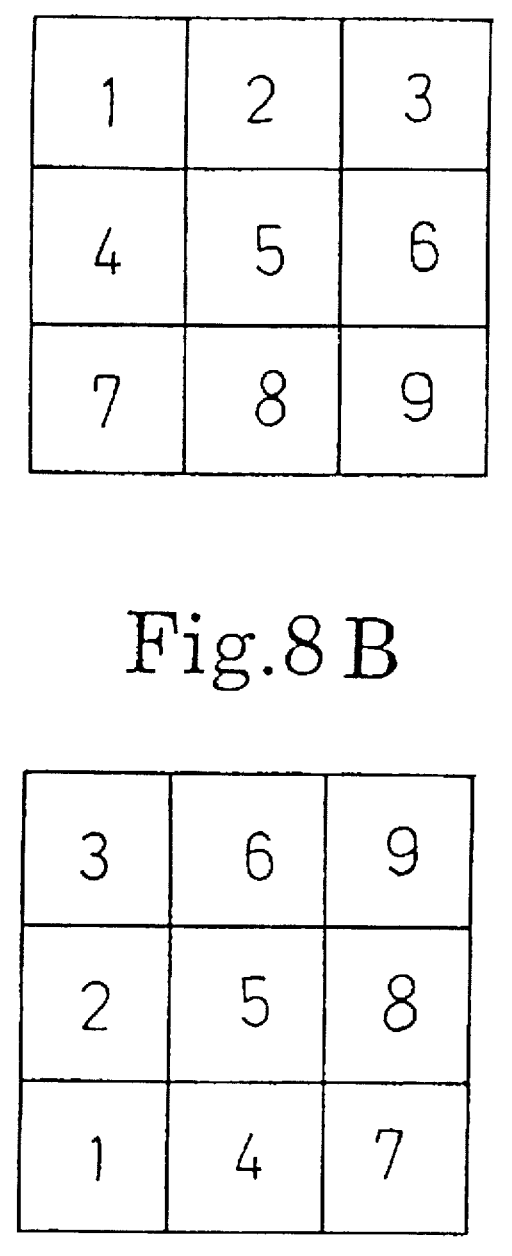

The print device of this embodiment is operated according to the flowchart shown in FIGS. 7A and 7B. After a print operation is started, in step S1, the sheet printing direction is first checked by the sensor 407 to determine if it is the lateral printing direction. This simultaneously determines a reproduction direction of the binary image data. If, in step S1, the printing direction is identified to be a lateral direction, control continues to step S2, where the threshold values are interchanged between lines and columns by executing the recording matrix altering program so that the recording matrix is counterclockwisely rotated by 90 degrees, as shown in FIGS. 8A and 8B. Control then continue to step S3. Otherwise, if the identified printing direction is not lateral, control jumps directly to step S3.

FIG. 8A represents the arrangement of pixel numbers of the recording matrix when a sheet is set in a longitudinal direction. When a sheet is set in a lateral direction, the threshold values which are stored at the pixel numbers of FIG. 8A are shifted to the numbers shown by FIG. 8B.

Figure 9:
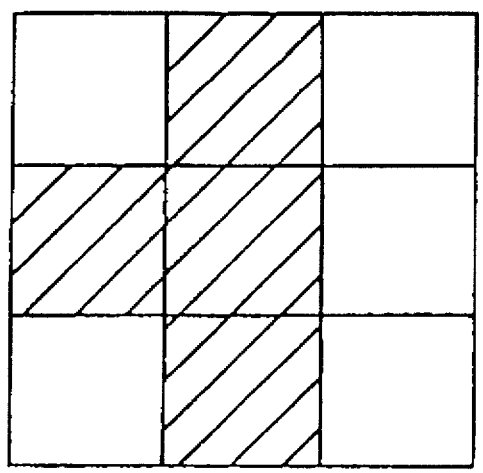
FIG. 9A shows the recording matrix of FIG. 3A for a laterally-placed sheet.
FIG. 9B shows a picture element which is set at an output level of 0.5 in accordance with the recording matrix shown in FIG. 9A.

Accordingly, when the print operation is conducted to a laterally-placed sheet, the arrangement of the recording matrix, which is set as shown by FIG. 3A, is altered to another arrangement, as shown by FIG. 9A. For example, when the output print level is equal to 0.5, the cell is set as shown by FIG. 9B, such that the arrangement of the cell shown by FIG. 3B is rotated counterclockwise by 90 degrees.

Thereafter, the half-tone image is subjected to half-tone screening by executing the image data development program. That is, the threshold value of the recording matrix is compared with the output level of the original half-tone image to be reproduced. Thus, in step S3, if the output level exceeds the threshold value, a black dot (output dot) is set to the corresponding picture element to digitalize the original image. Then, in step S4, the binary image data generated in step S3 is printed on a sheet by the print engine 605. The process then stops.

Figure 10A:
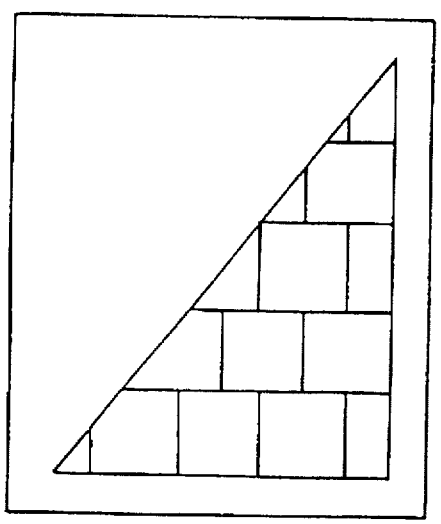
FIGS. 10A–10D show variation of print results in accordance with the sheet printing direction.
Figure 10B:
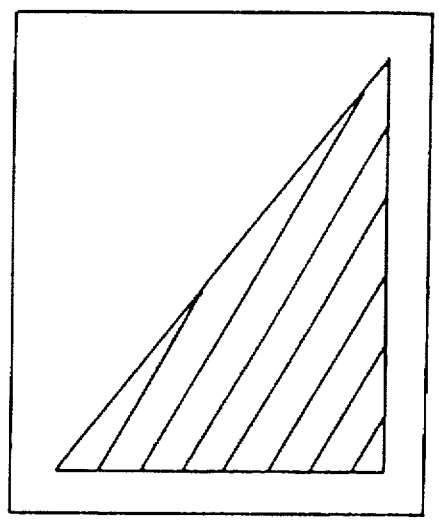
Figure 10C:
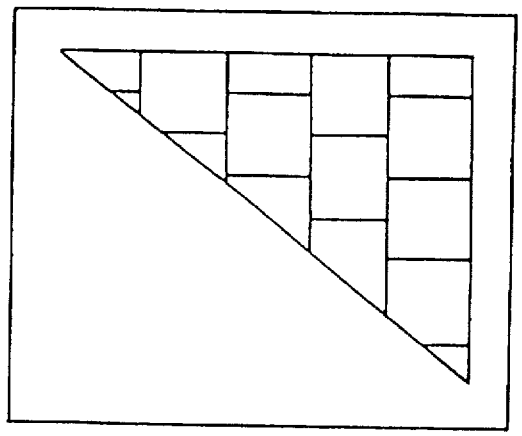
Figure 10D:
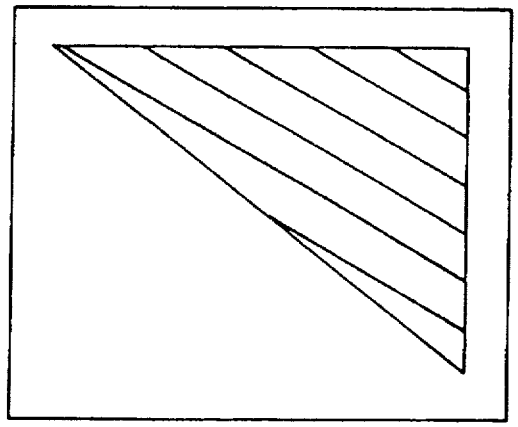
Figure 11A:
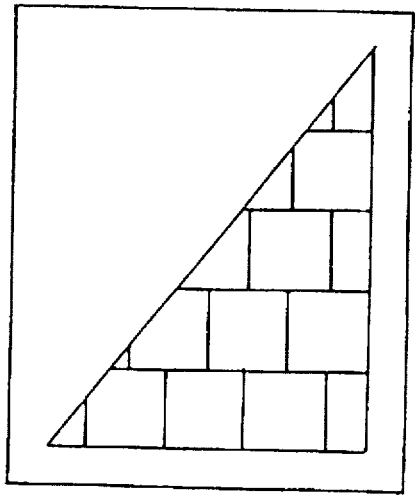
FIGS. 11A–11D show print results of a conventional print device when the sheet printing direction is varied.
Figure 11B:
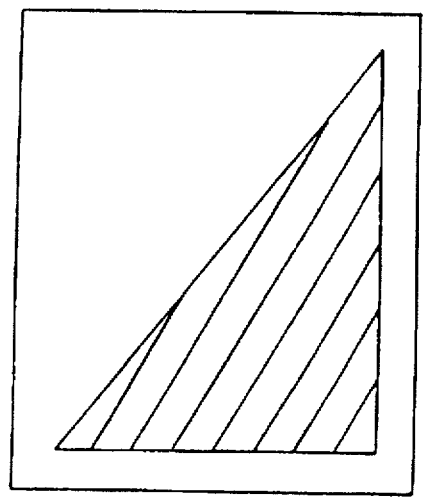
Figure 11C:
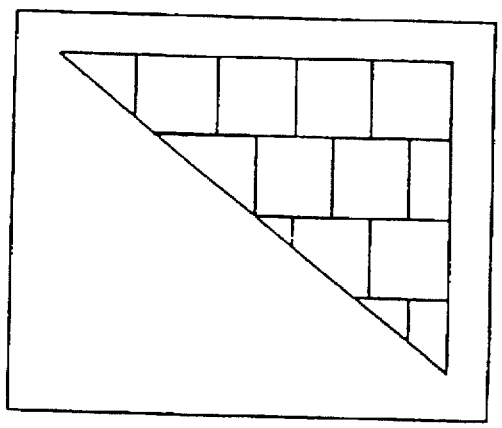
Figure 11D:
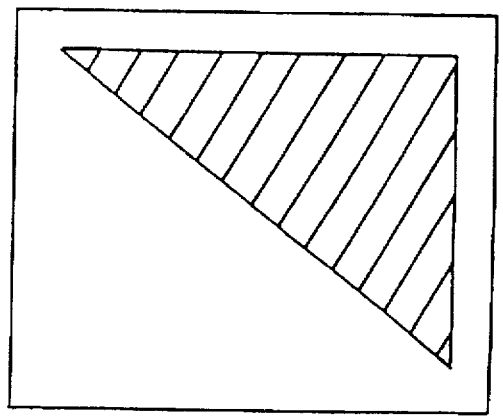

FIGS. 10A–10D show the variation in the print results of the triangular portion of the half-tone image 200 in accordance with a printing direction of the sheet. FIGS. 10A and 10B show the print results which are obtained by using the cell patterns 201 and 202, respectively, to conduct the print operation on a longitudinally-arranged sheet. FIGS. 10C and 10D show the print results which are obtained by using the cell patterns 201 and 202, respectively, to conduct the print operation on a laterally-arranged sheet. As apparent from a comparison of FIGS. 10A–10D, and a comparison of FIGS. 10A–10D to FIGS. 11A–11D, in the preferred embodiment of this invention, the cell pattern is invariable with respect to the figure direction irrespective of the longitudinal and lateral arrangements. Thus, the same print result is obtained between the longitudinally and laterally arranged sheets. This invention is not limited to the above embodiment, and various modifications may be made without departing from the subject matter of this invention.

For example, in this embodiment, the recording matrix altering program is constituted for rearranging the threshold values of the recording matrix so that these values are interchanged between lines and columns, thereby altering the recording matrix for the longitudinally-arranged sheet or laterally-arranged sheet. However, it may be adopted that recording matrixes for the longitudinally-arranged sheets and the laterally-arranged sheets are beforehand provided, and the recording matrix to be used is selectively switched to one of these recording matrixes in accordance with the sheet printing direction.

As is apparent from the foregoing, according to the print device of this invention, the same output result can be obtained for the same output print data irrespective of the arrangement direction of sheets set in the print device.

What is claimed is:

1. A printing device for image printing in which output dots are suitably arranged within a recording matrix, the recording matrix corresponding to a picture element of an image to be printed, and image data is converted to binary data, the printing device comprising:

identifying means for identifying a sheet printing direction; and threshold value altering means for altering threshold values of the prescribed recording matrix based on the sheet printing direction identified by said identifying means.

2. The printing device of claim 1, wherein the picture element is formed of a plurality of device pixels and the threshold values of the recording matrix are set for every device pixel of the picture element.

3. The printing device of claim 2, wherein said threshold value altering means rearranges the threshold values so that the threshold values are interchanged between columns and lines.

4. The printing device of claim 1, wherein a type of said image data is at least one of at least halftone image data, line art image data, continuous-tone image data, and text data.

5. The printing device of claim 4, further comprising a plurality of recording matrices, one of the plurality of recording matrices being selected based on the type of said image data.

6. The printing device of claim 1, wherein the identifying means comprises:

a paper storing means having ribs; and detector means.

7. A printing device for image printing in which output dots are suitably arranged within a recording matrix, the recording matrix corresponding to a picture element of an image to be printed, and image data is converted to binary data, the printing device comprising:

a paper tray in which paper is disposed;

a paper direction detector detecting a paper direction of the paper disposed in the paper tray; and a threshold value switching device switching threshold values of the recording matrix based on the paper direction detected by said paper direction detector.

8. The printing device of claim 7, wherein the picture element is formed of a plurality of device pixels and the threshold values of the recording matrix are set for every device pixel of the picture element.

9. The printing device of claim 8, wherein said threshold value switching device rearranges the threshold values so that the threshold values are interchanged between columns and lines.

10. The printing device of claim 7, wherein a type of said image data is at least one of at least half-tone image data, line art image data, continuous-tone image data, and text data.

11. The printing device of claim 10, further comprising a plurality of recording matrices, one of the plurality of recording matrices being selected based on the type of said image data.

12. The printing device of claim 7, wherein the paper tray is a paper cassette.

13. The printing device of claim 12, wherein the paper cassette has a plurality of paper direction detecting ribs, and the paper direction detector is engagable with the plurality of paper direction detecting ribs to detect a paper direction of the disposed paper.

14. A method for operating a printing device for image printing in which output dots are suitably arranged within a recording matrix, the recording matrix corresponding to a picture element of an image to be printed, and image data is converted to binary data, the method comprising the steps of:

specifying a sheet printing direction; and altering threshold values of the recording matrix based on the specified sheet printing direction.

15. The method of claim 14, wherein the picture element is formed of a plurality of device pixels, the method further comprising the step of setting the threshold values of the recording matrix for every device pixel of the picture element.

16. The method of claim 15, wherein said threshold value altering step comprises the step of interchanging the threshold values between columns and lines.

17. The method of claim 14, wherein a type of said image data is at least one of at least half-tone image data, line art image data, continuous-tone image data, and text data.

18. The method of claim 17, further comprising the step of selecting one of a plurality of recording matrices based on the type of said image data.

19. The method of claim 14, wherein the specifying step comprises the steps of:

providing a sheet on a paper tray of the printing device in one of a plurality of sheet printing directions;

positioning one of a plurality of sheet printing direction specifying means at a detection position, the positioned one of the plurality of sheet printing direction specifying means corresponding to the sheet printing direction of the sheet provided in the paper tray; and detecting the sheet printing direction of the sheet provided in the paper tray based on the positioned one of the plurality of sheet printing direction specifying means.

* * * * *